United States Patent
Roy et al.

(10) Patent No.: US 6,233,994 B1
(45) Date of Patent: May 22, 2001

(54) APPARATUS FOR AND METHOD OF PROCESSING BILLETS IN A ROLLING MILL

(75) Inventors: Colin Roy, Worcester; T. Michael Shore, Princeton; Melicher Puchovsky, Dudley, all of MA (US)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 08/977,286

(22) Filed: Nov. 24, 1997

(51) Int. Cl.[7] .............................. B21B 27/06; B21B 39/08
(52) U.S. Cl. ................................... 72/202; 72/250
(58) Field of Search .......................... 72/201, 202, 229, 72/226, 227, 228, 222, 250

(56) References Cited

U.S. PATENT DOCUMENTS

| | | | |
|---|---|---|---|
| 3,675,909 | * 7/1972 | Neumann | 72/202 |
| 4,393,680 | * 7/1983 | Kovacs | 72/234 |
| 5,287,715 | * 2/1994 | Kusaba | 72/229 |

* cited by examiner

Primary Examiner—Rodney A. Butler
(74) Attorney, Agent, or Firm—Samuels, Gauthier & Stevens

(57) ABSTRACT

A rolling mill has roughing, intermediate and finishing roll stands on a first side of a billet reheating furnace, and a breakdown mill on an opposite second side of the furnace. Billets are heated to an elevated rolling temperature in the furnace and are then ejected to the second side of the furnace for rolling in the breakdown mill before being directed back through the furnace for continued rolling into finished products at the first side of the furnace in the roughing, intermediate and finishing roll stands.

6 Claims, 4 Drawing Sheets

APPARATUS FOR AND METHOD OF PROCESSING BILLETS IN A ROLLING MILL

BACKGROUND OF THE INVENTION

1. Field of the Invention

This invention relates generally to rolling mills producing continuously hot rolled steel bars, rods and the like, and is concerned in particular with an improvement which enables existing mills to benefit from the cost savings associated with rolling larger billets, without necessitating either a relocation or a substantial reconfiguration of the billet reheating furnace.

2. Description of the Prior Art

Rod producers are now facing increasing demands for larger heavier rod coils and/or improved metallurgical properties throughout the entire cross section of the rod. Rolling longer billets will satisfy the first demand, but not the second. Rolling standard length billets with larger cross sections satisfies both demands.

The resulting coils are larger and heavier, and the higher total reductions required to roll the larger billets down to rod sized will impart improved metallurgical properties uniformly from the surface to the center of the rods.

In the conventional rolling mill installation, the entry end of the roughing section is positioned in close proximity to the exit door of the billet reheating furnace. This allows rolling to commence as soon as the billet emerges from the furnace, with minimum heat loss. However, should the mill operator wish to decrease the cross section of the billet being rolled, there is insufficient space available on the rolling line to accommodate the additional roll stands needed to roll the larger cross sections down to sizes suitable for continued rolling in the remainder of the existing mill.

Space can be freed up by moving or substantially reconfiguring the furnace, or by rearranging equipment along the rolling line. However, the costs involved in doing so, both with regard to capital expenditures and lost production time, are extremely high and in most cases, prohibitive.

The objective of the present invention is to provide an apparatus layout and a method of rolling which enables larger billets to be rolled through an existing mill, without having to substantially reconfigure or move the billet reheating furnace, and with only a minimum loss of valuable production time.

SUMMARY OF THE INVENTION

In accordance with the present invention, the billet reheating furnace is provided with a second opening on its back side facing away from the existing mill. The second opening is in alignment with a first opening on the front side of the furnace facing towards the existing mill. Additional breakdown roll stands are installed on the back side of the furnace where ample space is usually available or easily provided without having to disturb existing equipment. Reheated billets are ejected axially from the furnace via the second opening for rolling in the breakdown stands. The resulting process sections of reduced cross-sectional area are then returned back through the furnace via the second and first openings for continued rolling through the remainder of the existing rolling mill.

DESCRIPTION OF PREFERRED EMBODIMENT

Figure 1:
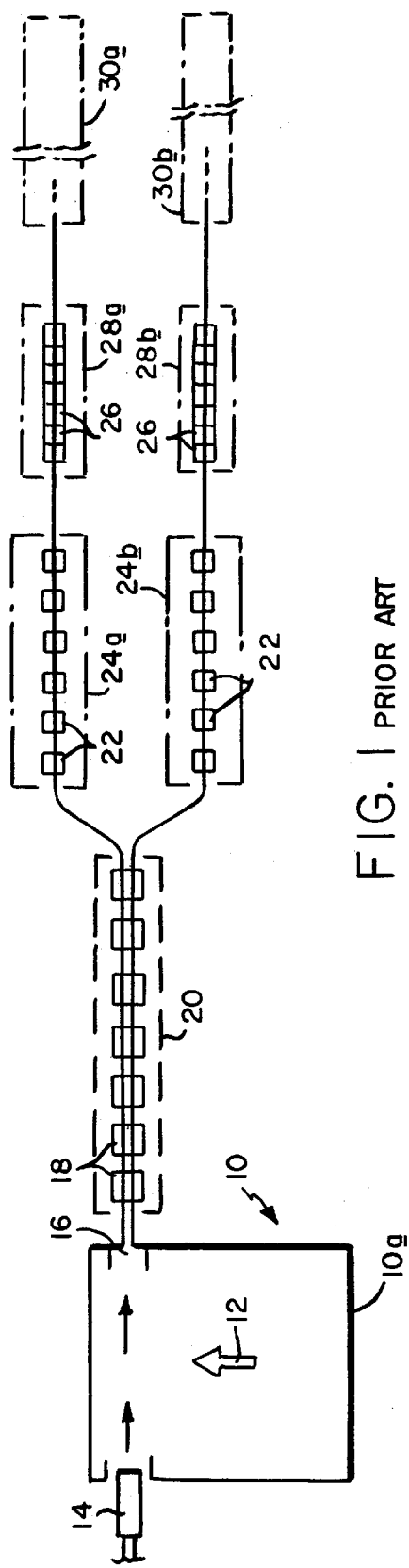
FIG. 1 is a diagrammatic layout of a convention rolling mill.
Figure 2:
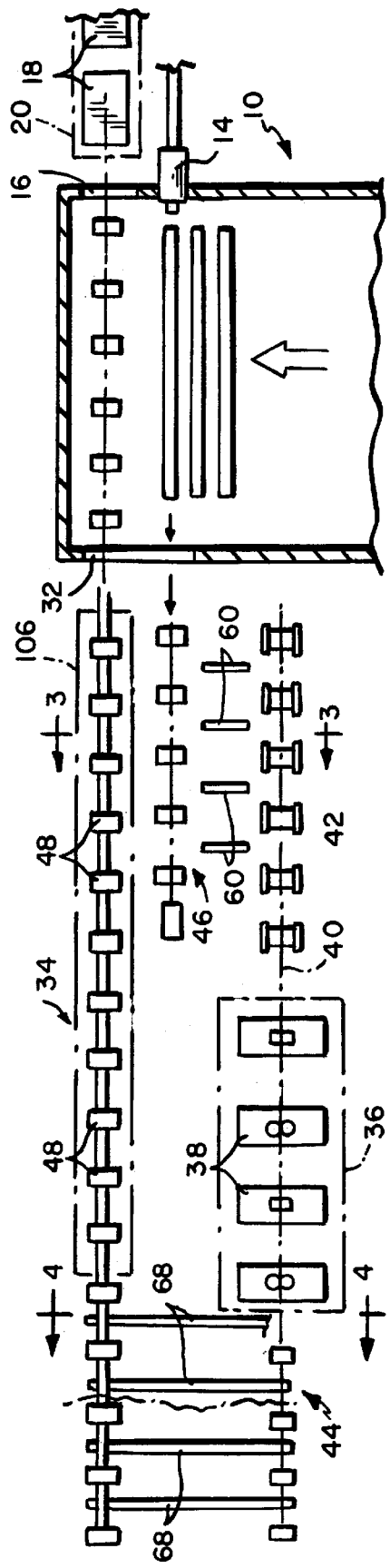
FIG. 2 is a diagrammatic view of the same rolling mill after it has been modified to include a breakdown area in accordance with the present invention

Referring initially to FIG. 1, a conventional rolling mill layout is shown comprising a billet reheating furnace 10 in which billets are loaded at an entry end 10a and transferred across the furnace in the direction indicated by arrow 12. In the course of being transferred across the furnace, the billets are heated to an elevated rolling temperature, typically above 1100° C. A pushout mechanism 14 of conventional design then axially ejects the reheated billets through a first opening 16 in a first side of the furnace for rolling in the roll stands typically indicated at 18 of the roughing section 20 of the mill. The roughing section is capable of rolling two strands, which are then separated for continued rolling in the single strand roll stands typically indicated at 22 of intermediate sections 24a, 24b. Finish rolling occurs in the blocks 26 of finishing sections 28a and 28b. The finished products are then processed further in cooling lines 30a, 30b before being coiled or bundled.

It will be seen that very little space is normally provided between the furnace opening 16 and the beginning of the roughing section 20. Thus, if the mill operator wishes to adapt the mill to roll larger billets, the furnace 10 must either be moved or substantially reconfigured in order to accommodate additional breakdown roll stands. The costs involved is doing so can be prohibitive.

In accordance with the present invention, as depicted in FIGS. 2–5, the furnace 10 is provided with a second opening 32 on an opposite second side. The openings 16, 32 are in mutual alignment with each other and with the roughing section 20 of the mill. A roller table generally depicted at 34 extends from the second side of the furnace through the second opening 32 to the first opening 16.

A breakdown mill 36 has roll stands typically indicated at 38 located along a rolling line 40 on the second side of the furnace. Entry and exit roller tables 42, 44 are positioned along the rolling line 40 on the entry and exit sides of the breakdown mill 36.

The pushout mechanism 14 is relocated to the first side of the furnace, and is positioned to axially eject reheated billets from the furnace through the second opening 32 onto a roller table 46 located at an intermediate position between roller tables 42 and 34.

Figure 3:
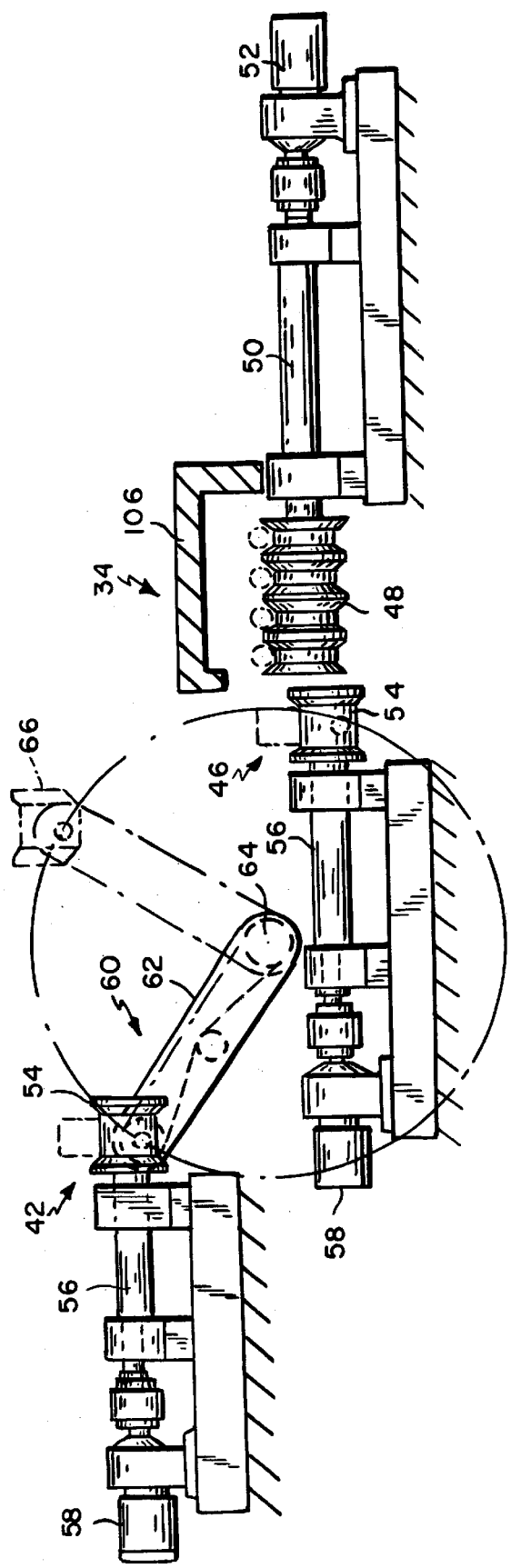
FIGS. 3 and 4 are sectional views on an enlarged scale taken along lines 3—3 and 4—4 of FIG. 2.

As can best be seen in FIG. 3, roller table 34 comprises a plurality of rollers 48 having multiple grooves. The rollers 48 are mounted in cantilever fashion on shafts 50 driven by motors 52.

The roller tables 42 and 46 are comprised of single groove rollers 54 mounted in cantilever fashion on shafts 56 driven by motors 58.

Transfer mechanisms 60 operate in unison to transfer reheated billets from roller table 46 onto roller table 42. The transfer mechanisms include arms 62 extending radially from a shaft 64. The arms carry saddles 66 on their outer ends. The saddles 66 are rotatable relative to the arms 62. Saddle rotation is controlled by conventional sprocket/chain combinations which maintain the saddles upright as the arms are rotated through 360°. Thus, during a billet transfer cycle, and as viewed in FIG. 3, the saddles are rotated in a counterclockwise direction to lift billets from roller table 46 for redeposit onto roller table 42.

Once on roller table 42, the billets are advanced axially to the breakdown mill 36 where they are rolled into round process sections of reduced cross-sectional area. The process sections are received on exit roller table 44, from which they are shifted laterally by second transfer mechanisms 68 onto roller table 34.

Figure 4:
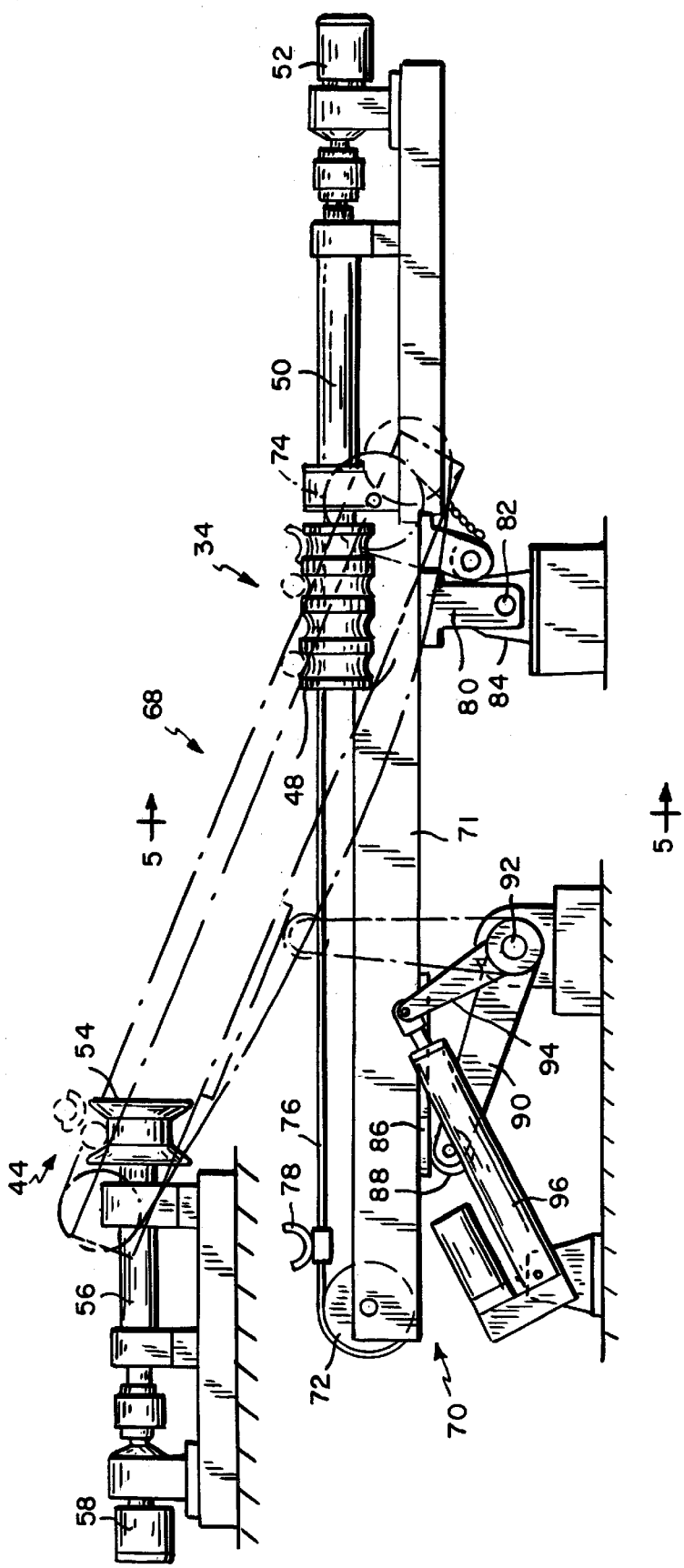
Figure 5:
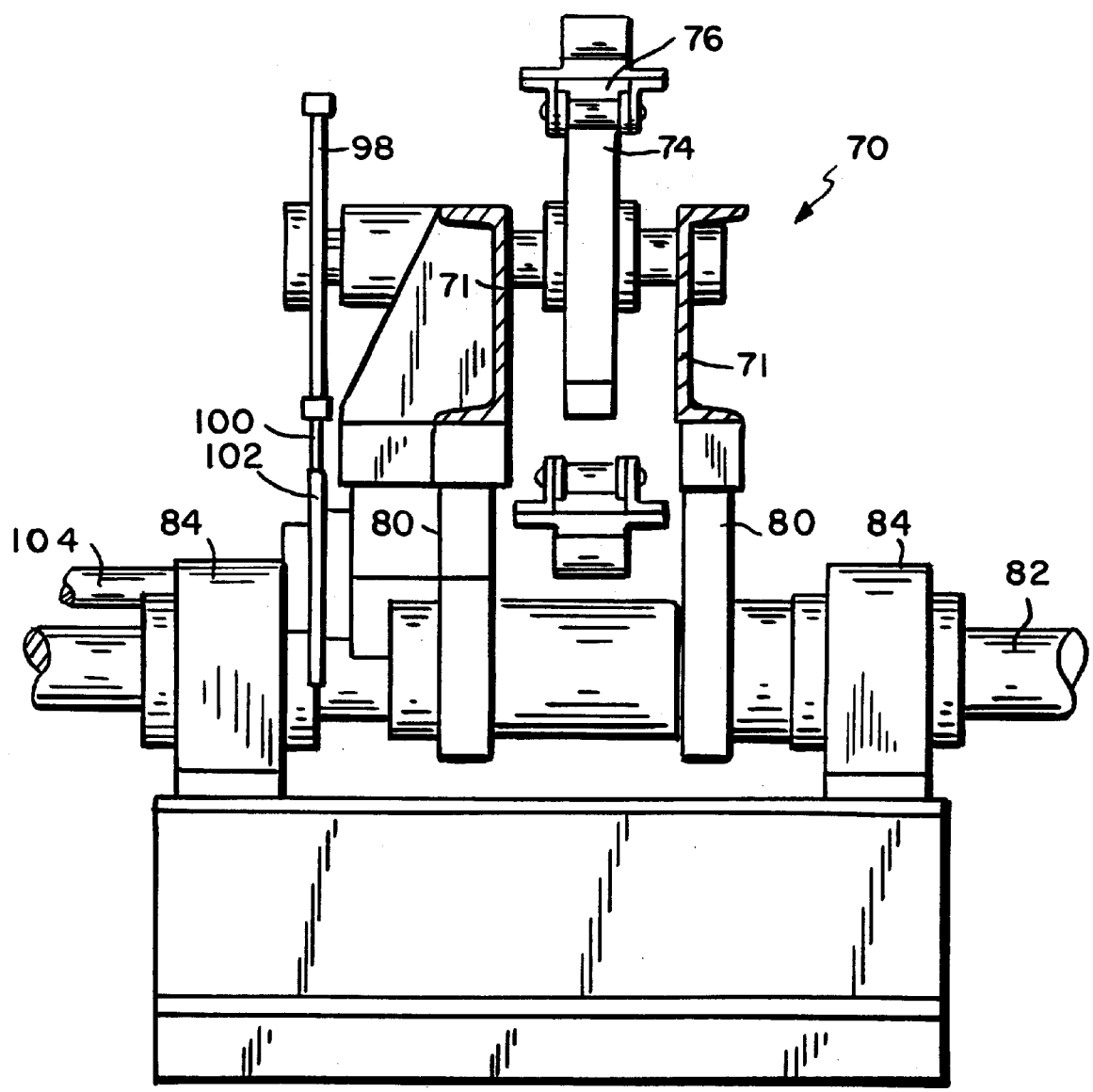
FIG. 5 is a sectional view taken along line 5—5 of FIG. 4.

As best can be seen in FIGS. 4 and 5, each transfer mechanism 68 comprises laterally extending carrier frame 70 having side members straddling sprockets 72, 74 at their opposite ends. A chain 76 is trained around the sprockets 72, 74 and is provided with one or more carriers 78. The carrier frame 70 has depending legs 80 rotatably supported at their lower ends on a crank shaft 82 journalled between pillow block 84.

A downwardly facing bearing plate 86 on the carrier frame 70 is acted upon by a roller 88 carried on the end of an arm 90 extending radially from a shaft 92. Shaft 92 is rotated by means of a crank arm 94 controlled by a linear actuator 96.

As shown in FIG. 5, sprocket 74 is carried on a shaft which carries an adjacent sprocket 98. Sprocket 98 is connected by chain 100 to a sprocket 102 carried on and driven by shaft 104. The shafts 82, 92 and 104 are the control shafts which are selectively rotated to operate the transfer mechanisms 68 in unison through repetitive sequences beginning at the position shown by the solid lines in FIG. 4, where the carrier frames 70 are horizontally disposed with carriers 78 parked beneath roller conveyer 44. The linear actuator is then operated to rotate shaft 92 in a clockwise direction, thus acting through crank arms 94 to rotate arms 90 and thereby pivotally elevate the the carrier frames 70 to the inclined positions shown by the broken lines. This results in a process section being engaged by the carriers 28 and elevated above roller table 44.

Shaft 104 is then rotated to operate through sprockets 98, 102 and chains 100 to drive, sprockets 74, which in turn operate through chains 76 and sprockets 72 to propel the carriers 78 downwardly to a position over a selected groove in the rollers 48 of roller table 34. The carrier frames 70 are moved to horizontal transfer positions while the process section is being carried to selected roll grooves. Crank shaft 82 and actuator 94 are then operated to lower the carrier frames 70 and thus transfer the process section from the carrier members 78 onto the table 34. The motors 52 are then operated to axially propel the process section along table 34 back through the furnace 10 via openings 32 and 16 for continued rolling in the remainder of the mill. Portions of table 34 may advantageously be covered by an insulated roof 106 in order to conserve heat. By appropriate operation of transfer chains 76 and crank shaft 82, process sections can be deposited sequentially in selected grooves of the table rollers 48, thus alternately feeding product to one or the other of the two rolling lines of the roughing section 20 of the existing mill.

In light of the foregoing, it will now be appreciated by those skilled in the art that with the present invention, an existing mill can be readily adapted to roll larger sized billets without having to relocate or extensively modify the billet reheating furnace. The breakdown mill and related roller tables and transfer mechanisms are located on the back side of the furnace, where ample space is normally available or readily obtainable, and the process sections rolled by the breakdown mill are efficiently directed back through the furnace for continued rolling in the existing mill.

Transfer of billets and process sections may be achieved by the devices described above, or by other conventional equivalent devices well known to those skilled in the art.

We claim:

1. A rolling mill comprising:
   a furnace for reheating billets to an elevated rolling temperature;
   roughing, intermediate and finishing roll stands positioned at a first side of said furnace;
   breakdown roll stands positioned at an opposite second side of said furnace;
   means for axially ejecting reheated billets from said furnace to said second side for rolling in said breakdown roll stands into process sections of reduced cross sectional area; and
   handling means for directing said process sections back through said furnace to said first side for continued rolling in said roughing, intermediate and finishing roll stands.

2. The rolling mill of claim 1 further comprising first and second mutually aligned openings located respectively in the first and second sides of said furnace, said reheated billets being ejected from said furnace through said second opening, and said process sections being directed back through said furnace via said second and first openings.

3. The rolling mill as claimed in claim 2 wherein said first and second openings are aligned with a roller delivery table located on the second side of said furnace and said breakdown roll stands are aligned along a rolling line parallel to said delivery table.

4. The rolling mill as claimed in claim 3 wherein said handling means includes means for laterally transferring said process sections from said rolling line onto said delivery table.

5. The rolling mill as claimed in claim 3 wherein said reheated billets are ejected from said furnace to an intermediate position between said delivery table and said rolling line, and further comprising means for laterally transferring said billets from said intermediate position onto said rolling line.

6. A method of rolling billets in a rolling mill, comprising:
   heating the billets to an elevated rolling temperature in a furnace having first and second openings on opposite first and second sides thereof;
   ejecting reheated billets axially from said furnace through said second opening;
   rolling the thus ejected reheated billets into process sections in breakdown roll stands located on the second side of the furnace; and
   directing the process sections back through the furnace via said second and first openings for continued rolling in roughing, intermediate and finishing roll stands located on the first side of said furnace.

* * * * *